(12) United States Patent
Ortmann et al.

(10) Patent No.: US 9,296,290 B2
(45) Date of Patent: Mar. 29, 2016

(54) MULTIPLE-RATIO TRANSMISSION DOWNSHIFT STRATEGY FOR HYBRID ELECTRIC VEHICLE POWERTRAINS

(75) Inventors: Walter Joseph Ortmann, Saline, MI (US); Daniel Scott Colvin, Farmington Hills, MI (US); Brian Thomas Soo, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 877 days.

(21) Appl. No.: 12/732,642

(22) Filed: Mar. 26, 2010

(65) Prior Publication Data

US 2011/0172862 A1    Jul. 14, 2011

(51) Int. Cl.
| | |
|---|---|
| *B60K 6/48* | (2007.10) |
| *B60W 10/06* | (2006.01) |
| *B60W 10/08* | (2006.01) |
| *B60W 10/115* | (2012.01) |
| *B60W 20/00* | (2006.01) |
| *B60W 30/19* | (2012.01) |
| *F16H 61/02* | (2006.01) |
| *F16H 59/50* | (2006.01) |

(52) U.S. Cl.
CPC ................. *B60K 6/48* (2013.01); *B60W 10/06* (2013.01); *B60W 10/08* (2013.01); *B60W 10/115* (2013.01); *B60W 20/00* (2013.01); *B60W 30/19* (2013.01); *F16H 61/0213* (2013.01); *B60W 2710/083* (2013.01); *F16H 59/50* (2013.01); *Y02T 10/6221* (2013.01); *Y02T 10/6286* (2013.01); *Y10T 477/23* (2015.01)

(58) Field of Classification Search
CPC ....... B60K 6/48; F16H 61/0213; B60W 10/06; B60W 10/08; B60W 10/115; B60W 20/00; B60W 30/19
USPC ........ 701/22; 180/65.1, 65.21, 65.22, 65.225, 180/65.25, 65.26, 65.6; 903/903, 909, 915
See application file for complete search history.

(56) References Cited

U.S. PATENT DOCUMENTS

| | | | |
|---|---|---|---|
| 6,070,680 | A * | 6/2000 | Oyama ...................... 180/65.25 |
| 6,321,143 | B1 | 11/2001 | Phillips et al. |
| 6,524,216 | B2 | 2/2003 | Suzuki et al. |
| 6,837,323 | B2 | 1/2005 | Denton et al. |
| 7,331,899 | B2 | 2/2008 | Ortmann et al. |
| 7,520,353 | B2 * | 4/2009 | Severinsky et al. ........ 180/65.28 |
| 7,775,310 | B2 * | 8/2010 | Andri ......................... 180/65.28 |
| 7,792,628 | B2 * | 9/2010 | Aswani et al. ............... 701/103 |
| 7,805,238 | B2 * | 9/2010 | Andri ........................... 701/104 |
| 7,956,560 | B2 * | 6/2011 | Izumi et al. .................... 318/376 |
| 2001/0003109 | A1 * | 6/2001 | Tabata ............................. 477/5 |
| 2002/0023789 | A1 * | 2/2002 | Morisawa et al. ............ 180/65.2 |
| 2003/0000751 | A1 * | 1/2003 | Denton et al. ............... 180/65.7 |
| 2003/0085577 | A1 * | 5/2003 | Takaoka et al. ............ 290/40 C |

(Continued)

FOREIGN PATENT DOCUMENTS

JP         2000-23309         1/2000

*Primary Examiner* — John Q Nguyen
*Assistant Examiner* — Michael Whalen
(74) *Attorney, Agent, or Firm* — David B. Kelley; Brooks Kushman P.C.

(57) ABSTRACT

A control system and method for a hybrid electric vehicle powertrain supplies battery power boost torque to vehicle traction wheels to modify shift points for a multiple ratio transmission in the powertrain. A shift schedule is adjusted to avoid a downshift for small changes in torque demand, thus reducing shift frequency due to small transient changes in torque demand.

17 Claims, 5 Drawing Sheets

(56) References Cited

U.S. PATENT DOCUMENTS

| | | |
|---|---|---|
| 2004/0104059 A1* | 6/2004 | Yamamoto et al. .......... 180/65.2 |
| 2004/0176211 A1* | 9/2004 | Kitajima et al. .................. 477/3 |
| 2005/0003926 A1* | 1/2005 | Hanada et al. .................... 477/3 |
| 2005/0103544 A1* | 5/2005 | Takami et al. ............... 180/65.2 |
| 2007/0024219 A1* | 2/2007 | Aoyagi et al. ................ 318/139 |
| 2007/0204601 A1* | 9/2007 | Ishii et al. ....................... 60/295 |
| 2007/0232440 A1 | 10/2007 | Han |
| 2007/0239339 A1 | 10/2007 | Martin et al. |
| 2008/0196954 A1* | 8/2008 | Soliman et al. ............. 180/65.2 |
| 2009/0038586 A1* | 2/2009 | Andri ....................... 123/406.34 |
| 2010/0063658 A1* | 3/2010 | Martin et al. .................. 701/22 |
| 2010/0138086 A1* | 6/2010 | Imamura et al. ................ 701/22 |
| 2010/0222950 A1* | 9/2010 | Ueoka ............................. 701/22 |

* cited by examiner

| SOC (%) | MODIFIED 6-5 SHIFT POINT (kph) |
|---|---|
| 50 | 80.0 |
| 49 | 81.4 |
| 48 | 82.8 |
| 47 | 84.2 |
| 46 | 85.6 |
| 45 | 87.0 |
| 44 | 88.4 |
| 43 | 89.4 |
| 42 | 91.2 |
| 41 | 92.6 |
| 40 | 94.0 |

AT SOC = 46, MODIFIED 6-5 SHIFT POINT MOVES HIGHER THAN 85 kph SO A 6-5 SHIFT IS REQUESTED

| PEDAL POSITION (COUNTS) | 6-BOOST TORQUE | 6-5 SHIFT TORQUE |
|---|---|---|
| 0 | 0 | 0 |
| 100 | 0 | 0 |
| 200 | 0 | 0 |
| 300 | 0 | 5 |
| 400 | 0 | 10 |
| 500 | 1 | 20 |
| 600 | 2 | 30 |
| 700 | 2 | 40 |
| 800 | 3 | 50 |
| 900 | 4 | 60 |
| 1000 | 5 | 70 |

*Fig. 7a*

MULTIPLE-RATIO TRANSMISSION DOWNSHIFT STRATEGY FOR HYBRID ELECTRIC VEHICLE POWERTRAINS

BACKGROUND

1. Technical Field

The disclosed hybrid electric vehicle has an engine and a battery powered motor for delivering power to a multiple-ratio transmission for powering vehicle traction wheels.

2. Background Art

It is known design practice to use a combination of an internal combustion engine with an electric motor in a hybrid electric vehicle powertrain to provide the power needed at the vehicle traction wheels. Such vehicle powertrains will improve engine fuel economy compared to the fuel economy of a conventional vehicle with a powertrain that does not include an electric motor.

One example of such a hybrid electric vehicle powertrain is referred to as a modular hybrid transmission (MHT) that has a parallel hybrid architecture. The present invention may be used in a MHT, but it is not limited in use to a MHT. It may be applicable also to other known hybrid electric vehicle powertrains, such as a series hybrid powertrain or a power split hybrid powertrain. The latter powertrain establishes two power flow paths, one path delivering engine power and the other path delivering electric motor power to vehicle traction wheels.

The modular hybrid transmission presently described is a pre-transmission, parallel, hybrid powertrain with a clutch positioned between an electric motor and an engine. The clutch, which may be referred to as a disconnect clutch, may be fully integrated into a hydraulic control system for a multiple-ratio transmission. Further, it may be actuated by a linear solenoid, sometimes referred to as a variable force solenoid (VFS). The VFS is controlled by a geared transmission electronic control module (TCM).

In a non-hybrid conventional powertrain, there is a requirement known as top gear gradability. This requirement is the ability to maintain a given speed in top gear at 65 mph, for example, assuming that there are no accessory loads on the engine, such as an air conditioning compressor, and that there is no head wind. Typically, this requirement would be the ability to maintain a top gear on a 4.5% uphill grade. A low gradability requirement can improve highway fuel economy, whereas a high gradability requirement would improve drivability. A desirable gradability can reduce the amount of "shift busyness" whereby frequent upshifts and downshifts occur because of changes in road grade or because of small, transient changes in driver demand for torque at the wheels. An undesirable gradability may be apparent as a so-called "hunting" that occurs while traveling on a hilly terrain.

The transmission used in the modular hybrid transmission architecture herein described has multiple ratios, and the hydraulic transmission control system and the electronic transmission control system will achieve ratio changes between a high ratio and a so-called low ratio. Such changes will be referred to as upshifts or downshifts.

In certain hybrid electric vehicle powertrains, a so-called hydrokinetic torque converter is situated between the power output side of the engine and the power input side of the geared transmission. A torque converter includes an impeller driven by the engine and a turbine, which delivers power to a power input shaft for the transmission. A toroidal fluid flow circuit is established in the torque converter as engine power is delivered to the impeller and a toroidal fluid flow in the torque converter fluid circuit establishes a hydrodynamic torque. A stator or a reactor is disposed between the turbine fluid flow exit and the impeller fluid flow entrance. The stator changes the tangential direction of the toroidal fluid flow as the flow enters the impeller whereby a torque multiplication occurs due to a moment of momentum in the toroidal fluid flow path through the torque converter.

A torque converter lock-up clutch may be used to directly connect the impeller and the turbine for the torque converter after the torque converter achieves a speed ratio close to unity at a so-called clutch point. When the clutch point is achieved, a hydrodynamic fluid slip between the turbine and the impeller will occur. The lock-up clutch, as it is engaged, will reduce the slip to zero when torque multiplication at the converter is not required. This condition is known as a converter lock-up. For purposes of this disclosure, a converter lock-up may be considered to be a form of a transmission upshift.

A plot, which may be referred to as a downshift schedule, will illustrate a relationship between vehicle speed and a driver demand for torque, the latter being indicated by an accelerator pedal position. The plot for illustrating the shift point characteristics of a transmission upshift or a lock-up of the converter lock-up clutch will differ from the corresponding characteristics for a downshift or a converter unlock.

If the spacing requirements on the plot for an upshift and a downshift are too close, a so-called "hunting" may occur between the upshift and downshift states. This hunting can occur on a hilly and rolling terrain, for example. As the driver moves the accelerator pedal to demand additional output torque on an uphill slope, that typically would be followed by a back-off of the accelerator pedal if the driver wishes to maintain a constant speed on a downhill slope. As explained above, if the upshift and the downshift curves, or if the lock and unlock curves, are too close together, the changes in pedal position due to small transient changes in torque demand may cause the hunting condition to occur.

SUMMARY

The proposed control strategy has an additional curve on a shift schedule plot residing in ROM of a transmission control module (TCM) under supervisory control of a vehicle system controller (VSC), which will allow an electric boost torque from the motor. The additional curve on the plot (vehicle speed vs. accelerator pedal position) may be referred to as a boost curve. When the boost curve is crossed as the accelerator pedal is advanced, a boost torque will be available.

A high battery state-of-charge (SOC) indicates that the battery has sufficient energy to provide the reserve torque needed to adequately increase the output torque as a function of accelerator pedal movement. This will meet drivability requirements instead of forcing a downshift. The high SOC would be considered to be the normal operating state of the hybrid system. At a high SOC, the electrical boost will be used instead of a downshift to meet a driver request for torque. As the motor is being used to provide additional torque to the wheels over an extended time, however, the battery SOC will go down since there is no provision for charging the battery at that time.

At some point (e.g., on a long consistent uphill slope), the SOC may get too low to maintain vehicle functions. A low SOC indicates that there may be insufficient electrical capacity to meet the driver demand for torque at the wheels using the electric motor boost. At that time, a downshift must occur to protect the battery from being fully depleted. One method for accomplishing this is to temporarily modify the downshift point on a vehicle speed vs. torque demand (accelerator pedal position) plotted downshift schedule if the battery is being depleted below a calibrated threshold. The downshift point on a plot of the downshift schedule will move toward the current throttle position point on the downshift schedule. According to another method, the electrical boost is modified rather than the downshift schedule.

The amount of electrical boost in both of the modification methods is achieved by interpolating an electrical boost torque at a given vehicle speed. The interpolation is a linear interpolation along a plot between a point representing the electric torque at a calibrated downshift point at a given vehicle speed and the electric torque at a so-called calibrated boost point for a given vehicle speed.

BRIEF DESCRIPTION OF THE DRAWINGS

FIG. 7a is a chart of calibrated values of boost torque for sixth ratio and 6-5 shift points for various pedal positions.

PARTICULAR DESCRIPTION

Figure 1:
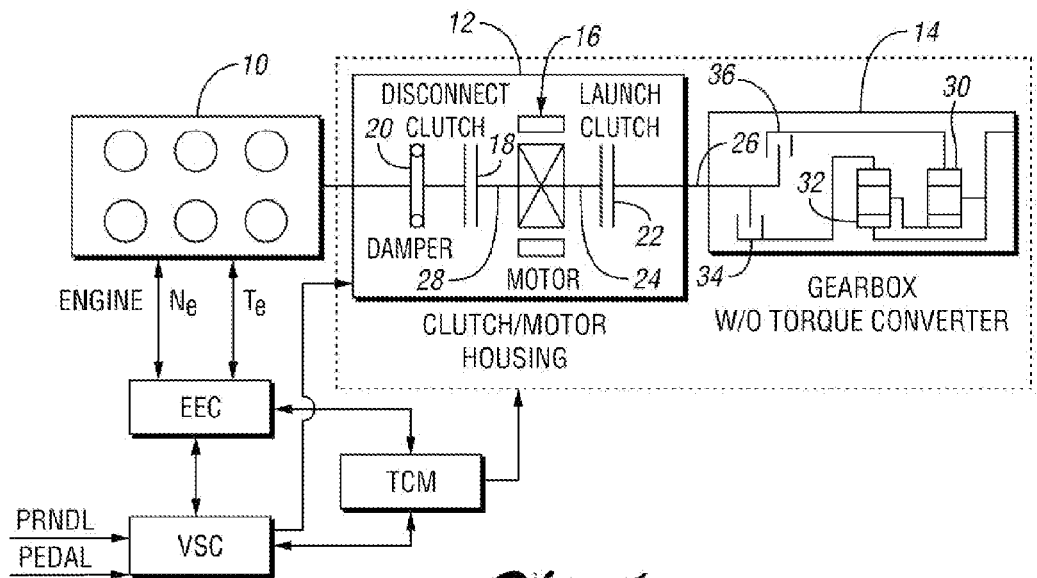
FIG. 1 is a schematic diagram of a modular hybrid transmission system capable of incorporating the invention.

FIG. 1 shows a typical modular hybrid transmission system. It comprises an engine 10, a clutch and motor assembly 12 and a multiple-ratio transmission 14. Engine torque is delivered to a battery powered motor 16 through a disconnect clutch 18. A damper 20 may be located between the clutch 18 and the engine 10. A launch clutch 22 selectively connects output shaft 24 of the motor to a transmission power input shaft 26. Engine torque is delivered through the clutch 18 and motor input shaft 28.

Although two simple planetary gear units 30 and 32 and two torque delivery selectively engageable clutches 34 and 36 are shown in FIG. 1, the transmission could include other gear units and other clutches as well as reaction brakes. The simplified illustration in FIG. 1 is intended to illustrate any transmission having multiple overall transmission ratios.

Figure 2:
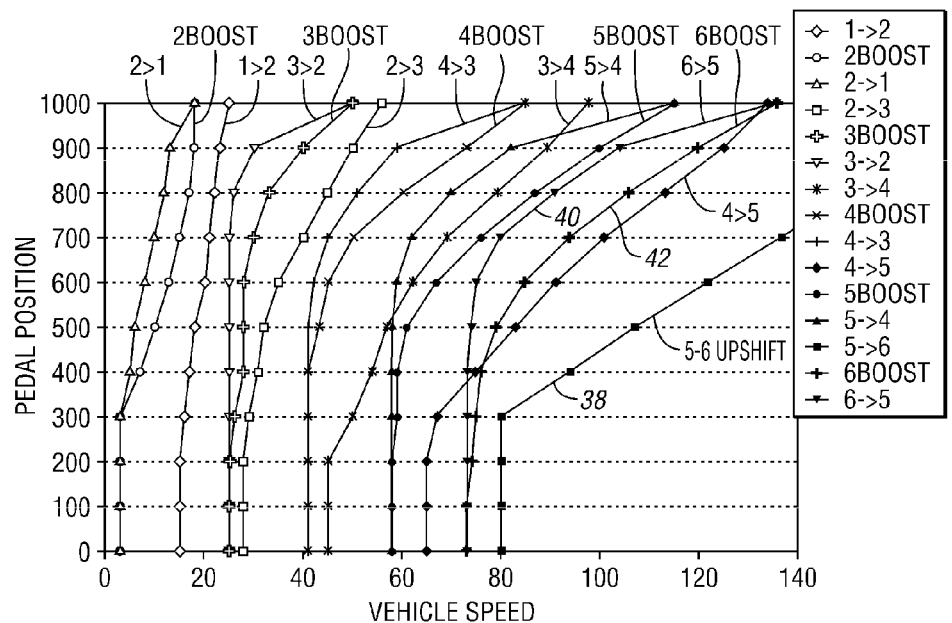
FIG. 2 is an example of state-of-charge based downshift schedules for a six-speed transmission.

FIG. 2 shows an example map of shift schedules for a six speed transmission. For any given vehicle speed, there will be an accelerator pedal position at which a downshift will occur when the pedal position is advanced at a given vehicle speed. An additional curve is added to the plot of FIG. 2 to indicate the point at which a boost from the electric motor begins. That curve is located between an upshift line and a downshift line.

A 5-6 upshift schedule is plotted in FIG. 2 at 38. A 6-5 downshift schedule is plotted at 40. Intermediate the plots 38 and 40 is a boost line for sixth ratio, as shown at 42. Similar plots are shown in FIG. 2 for each of the other five ratios and are identified accordingly by appropriate labels. In each instance the boost plot is situated between the upshift schedule and the downshift schedule.

Figure 3:
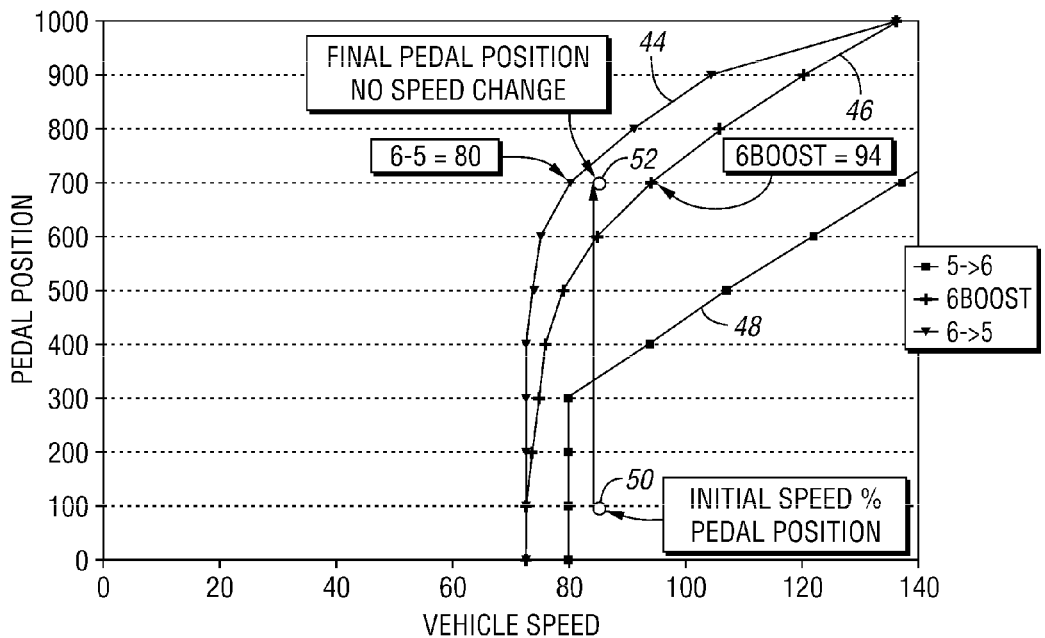
FIG. 3 is a plot of an example 6-5 downshift for a transmission having six forward driving ratios wherein the sixth ratio is the so-called high ratio.

A hypothetical example of how a 6-5 downshift schedule will function is plotted in FIG. 3. In FIG. 3, the downshift calibration point for a 6-5 downshift at a pedal position of 700 counts is 80 kilometers per hour (kph), and the 6 boost point is 94 kph. It will be assumed that initially the vehicle is travelling at 85 kph at 100 accelerator pedal counts. In FIG. 3, the 6-5 downshift schedule is shown at 44, the 6 boost plot is shown at 46 and the 5-6 upshift point is shown at 48. At 85 kph and 100 pedal counts, the transmission would be in sixth gear since it is below the line 48, as seen at 50. If it is assumed that the vehicle approaches a hill, the driver would increase the pedal position from 100 counts to 700 counts to maintain a vehicle speed, as shown at 52. Once the vehicle reaches the crest of a hill, the driver reduces the accelerator pedal back to the original position at 50. The speed that the vehicle is travelling while at the 700 count pedal position is below the 6-5 downshift point on the 6-5 schedule 44 and above the sixth boost line shown at 46. If the SOC is high or normal, the motor will be commanded to provide extra torque to meet the driver's torque demand. After the vehicle passes the crest of the hill and the driver returns the accelerator pedal to the 100 count pedal position 50, the motor will stop boosting torque and will return to the energy management based torque request. This eliminates a downshift and a resulting shift "busyness".

The strategy illustrated in FIG. 3 is appropriate for an electric motor boost throughout the length of the hill although the amount of energy in the battery for electric torque assistance is limited. If the hill is short, the boost will occur until the driver backs-out the accelerator pedal. For longer hills, the strategy can be modified to avoid battery SOC deterioration. It can end the motor boost and allow a downshift to occur. This will provide a sustainable means for meeting a driver demand for torque.

A first method for modifying the boost now will be described with reference to FIGS. 4, 4a and 5 where the downshift point will be modified temporarily. A high SOC calibration point may be, for example, 50% and a low SOC calibration point may be 40%, as indicated by dotted lines in FIG. 4 at 54 and 56, respectively. If at that time the pedal position is increased to 700 counts, the SOC is 70%, as shown at 56 in FIG. 5.

Figure 4:
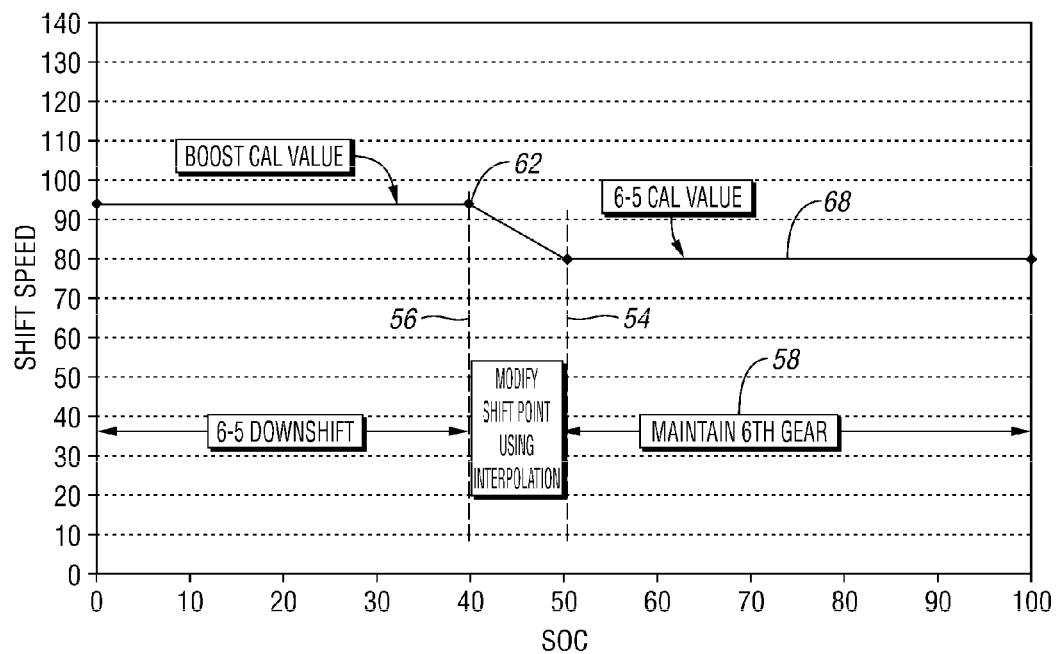
FIG. 4 is a plot showing a modification of the SOC high ratio shift point using the previously described first method.
Figures 4A, 5:
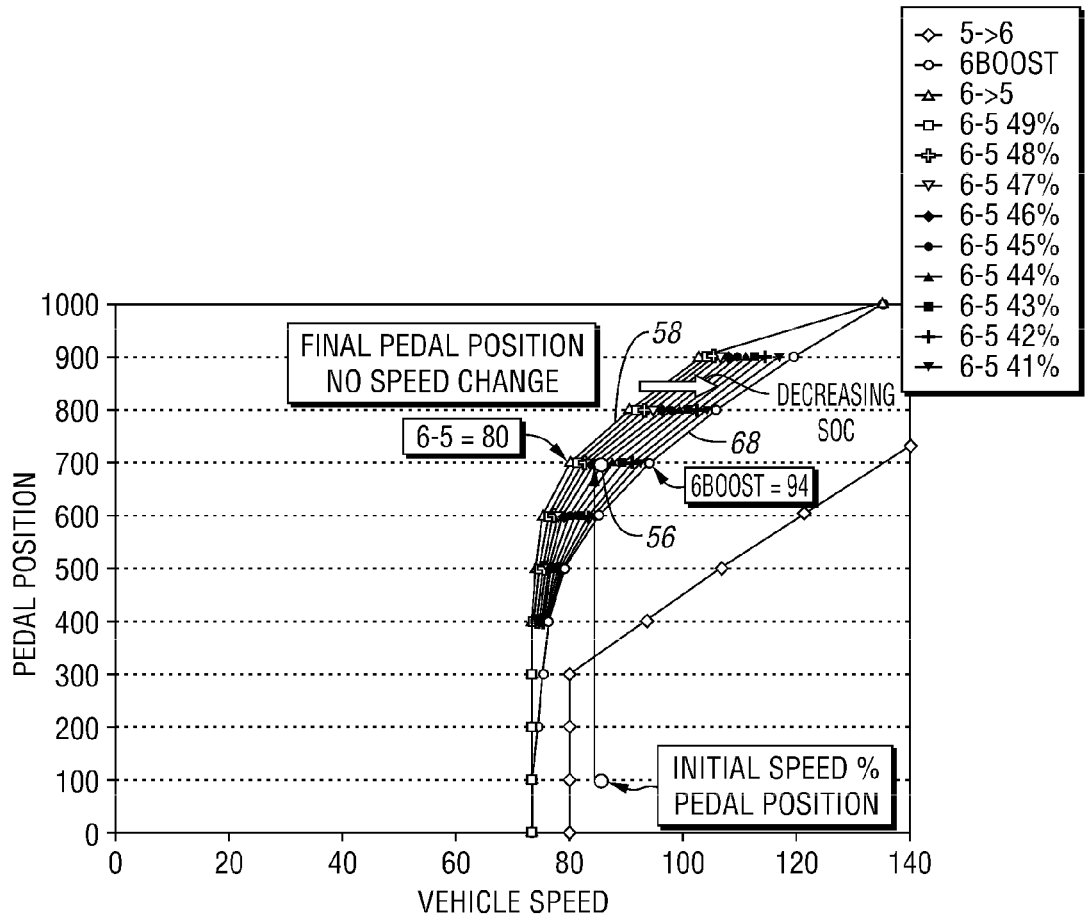
FIG. 4a is a chart showing various values for SOC and the modified shift points for each of multiple values for SOC.
FIG. 5 is a plot of 6-5 downshift points wherein the downshift point can be shifted toward a final pedal position point assuming there is no vehicle speed change.

The initial downshift schedule is shown at 58 in FIG. 5. If at the time the pedal is increased to 700 counts and the SOC is 70%, a downshift will not occur since the battery and the motor then will provide reserve torque. This is seen at 58 in FIG. 4. As the motor provides torque, the battery SOC will drop. If, for example, the battery SOC drops from 70 to 60 to 50, the motor will continue to provide a calibrated torque, and the modified downshift point will equal the calibrated downshift point as seen at 68 in FIG. 4. When the SOC drops below 50%, the modified downshift point will be a linear interpolation between the base downshift point and the boost point.

In this example in FIG. 4, the interpolation is provided in the table of FIG. 4a. From this table, it is apparent that the modified downshift curve moves toward the boost curve linearly as the battery SOC decreases. The modified downshift point continues to move until it equals the boost point, which in this case is at 40% SOC, as shown at 56 in FIG. 4. These modified shift points are illustrated in FIG. 5. In FIG. 5, for example, the 6-5 shift point at 80 kph will shift to the right as vehicle speed increases and as the accelerator pedal remains at the 700 count position. As the modified 6-5 downshift point is changed with the lowering of the SOC, a downshift to fifth ratio will occur. This is seen as point 80 on the shift point curve 58 moves to the middle position point 56.

In the 6-5 example shown in FIG. 4*a*, once the battery SOC reaches 46%, the vehicle speed will be above the modified downshift point. This will cause a 6-5 downshift to occur. This strategy thus will keep the battery from being drained, but it provides sufficient transient motor torque so that the downshift will not quickly shift on a short grade while eventually allowing the downshift to occur on a long grade.

As previously indicated, as battery SOC decreases, the 6-5 shift point moves to the right until it reaches the 6 boost point, as seen in FIG. 5. If the SOC is low, as shown in FIG. 4*a* as an SOC less than 40%, the crossing of the 6 boost point will result in a downshift since the battery is not available and since it needs to be protected from further discharge.

Some busyness will occur to protect the battery when the SOC is low. This busyness, which provides battery protection, is a trade off for the improvement in fuel economy that the lower gradability requirement provides.

In the case of the strategy illustrated in FIG. 5, an unexpected downshift may occur well after the initial pedal position change is made by the driver. If this condition is perceived by the driver to be a distraction, a second method for protecting the battery can be used. At a calibratable SOC, the amount of the boost decay from the initial level at 62 in FIG. 6, the SOC declines from 50% to 40% in the example of FIG. 6, as shown at 64. To maintain vehicle speed at this decayed or modified value, the driver would need to continue to crowd or advance the pedal position further to a higher and higher position until the downshift line is crossed. This method forces an interaction with the driver if he wishes to maintain the same vehicle speed. Otherwise, a decrease in vehicle speed would occur. The decrease in vehicle speed will also eventually cause the downshift to occur.

Figure 6:
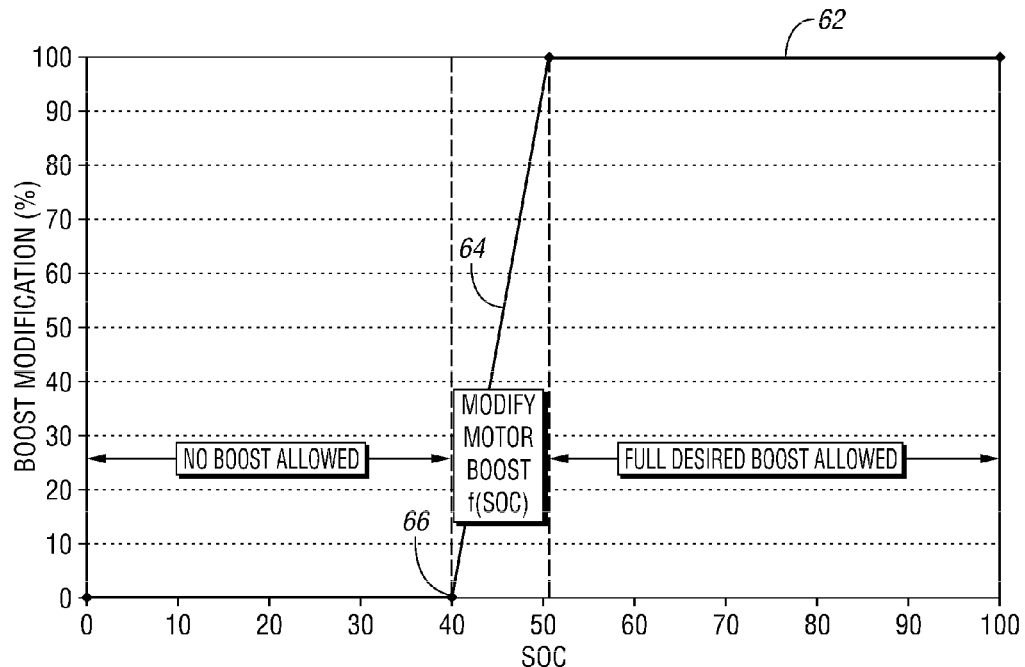
FIG. 6 is an electric boost modification plot showing the amount of boost modification for a given pedal position as a function of SOC.

If the torque is released at a slow enough rate, the need to downshift will be acceptable to the driver. As seen in FIG. 6, instead of modifying the downshift point as the SOC drops from 50% to 40%, as in the case of the previously described method, the amount of torque boost using the strategy of FIG. 6 will cause the motor torque and battery decay linearly with the lowered SOC until, in this example, a 40% SOC is reached when there will no longer be any boost as shown at 66 in FIG. 6. If the driver compensates by increasing pedal position, the pedal counts will increase until the 6-5 downshift curve is crossed at point 6 in FIG. 5. Conversely, if the driver maintains a constant pedal position, the vehicle will not maintain speed and eventually will slow until the 6-5 downshift line is crossed. If the battery SOC is low, using the method illustrated in FIG. 6, (i.e., SOC is below 40%), there will be no boost available above the 6 boost line 68 in FIG. 5. The driver will then need to advance the accelerator pedal further to get the desired torque demand.

In executing the modification methods described above, the algorithm seen in FIG. 7 needs to determine the amount of boost torque that will be used. As the driver demand increases, the accelerator pedal response must also increase to meet drivability requirements.

Figure 7:
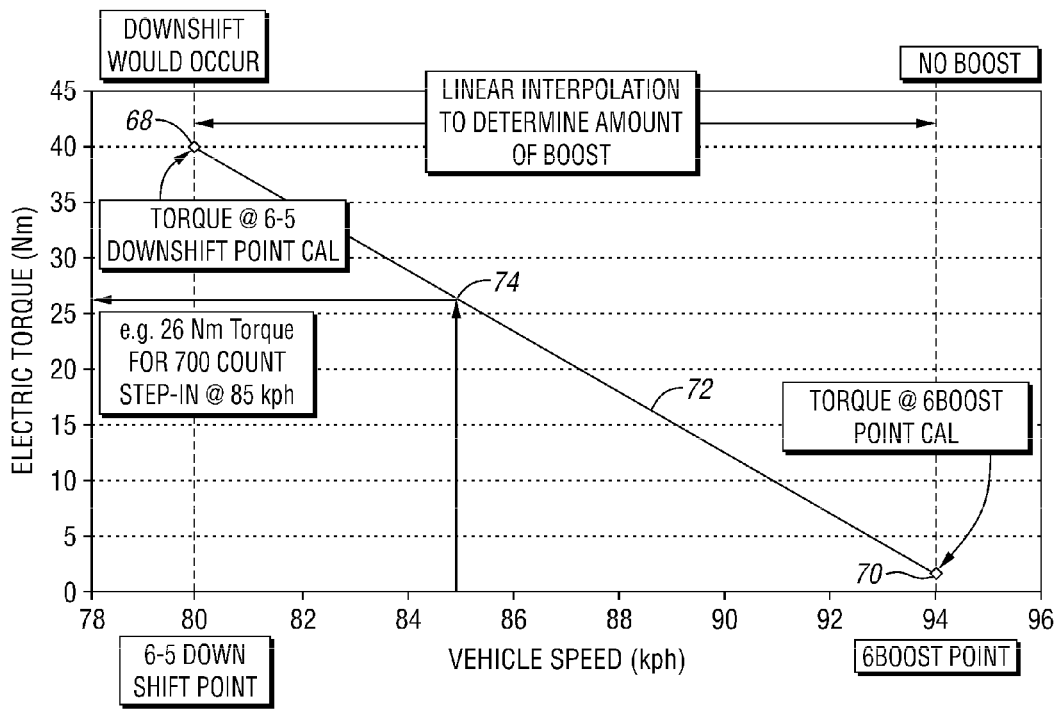
FIG. 7 is a plot showing an example of the amount of electric boost for a given vehicle speed.

The algorithm for determining the amount of boost is illustrated in FIG. 7 for the previously described 6-5 shift example. In FIG. 7, downshift prevention through an electric boost is done when the driver demand is between the 6-5 downshift point and the 6 boost point shown, respectively, at 68 and 70. In this example, at 700 count pedal position, the 6 boost point is 94 kph and the 6-5 downshift point is 80 kph. The linear plot 72 connects these two points. Once the 6 boost point is reached, an increase in output torque is needed to satisfy driver demand.

If the SOC state is high, the electric system will provide a minimum boost, as shown at 70 in FIG. 7, where electric boost is plotted against vehicle speed. When the 6 boost point is reached, the electrical torque demand will be a calibratable value, shown in FIG. 7 as "torque at 6 boost point cal", to provide a small increase in acceleration. If the pedal demand is increased to reach the 6-5 downshift point, the calibratable value indicated as "torque at 6-5 downshift point cal" is used. When the pedal is between these two points, as in the case of the 6-5 shift example of FIG. 6, the torque that is used will be interpolated. For example, see point 74 in FIG. 7.

FIG. 7*a* is a table that provides an example calibration for the 6-5 downshift electric torque compensation. For this example, the 6 boost torque at 700 accelerator pedal counts is calibrated for 2 Nm and the 6-5 downshift torque is calibrated at 700 accelerator pedal counts at 40 Nm. Using linear interpolation, the amount of torque requested for a driver demand at 85 kph is 26.4 Nm.

Although embodiments of the invention have been described, persons skilled in the art will recognize that modifications may be made without departing from the scope of the invention. All such modifications and equivalents thereof are covered by the following claims.

What is claimed:

1. A hybrid vehicle, comprising:
   an engine;
   a traction motor;
   a transmission; and
   a controller communicating with the transmission and containing transmission downshift schedules associating an accelerator pedal position and vehicle speed with a commanded downshift, and traction motor boost schedules associated with at least some accelerator pedal positions of the downshift schedules, wherein the controller operates the traction motor to boost output torque when the accelerator pedal position exceeds the associated traction motor boost schedule.

2. The hybrid vehicle of claim 1 wherein the controller signals the transmission to shift gears when the accelerator pedal position exceeds the transmission shift schedule for the commanded gear at a current vehicle speed.

3. The hybrid vehicle of claim 1 wherein the vehicle includes a battery for powering the traction motor and wherein the controller modifies the traction motor boost torque as a function of battery state-of-charge.

4. The hybrid vehicle of claim 1 wherein the controller is configured to temporarily modify the traction motor torque when a battery state-of-charge is below a calibratable threshold.

5. The hybrid vehicle of claim 4 wherein the controller commands a downshift based on a linearly interpolated value between the motor boost schedule and the associated downshift schedule.

6. The hybrid vehicle of claim 1 wherein the controller linearly reduces the traction motor boost torque when the battery state-of-charge is between upper and lower calibratable thresholds.

7. A method for controlling a hybrid electric vehicle having an engine, a battery powered traction motor, and a transmission, comprising:
   providing boost curves and downshift curves associated with vehicle speeds and accelerator pedal positions,
   operating the traction motor to increase vehicle output torque when accelerator pedal position crosses a boost curve associated with a current vehicle speed; and downshifting the transmission when accelerator pedal position crosses the downshift curve associated with current vehicle speed.

8. The method of claim 7 further comprising reducing traction motor boost torque for the accelerator pedal position and the current vehicle speed in response to a battery state-of-charge.

9. The method of claim 8 wherein reducing traction motor boost torque comprises linearly reducing traction motor boost torque from a maximum boost torque to zero boost torque in response to battery state-of-charge decreasing from an upper threshold to a lower threshold.

10. The method of claim 9 wherein the upper threshold is about 50% and the lower threshold is about 40%.

11. The method of claim 7 further comprising:
modifying the transmission downshift threshold in response to a battery state-of-charge.

12. The method of claim 11 wherein the transmission downshift threshold is linearly interpolated based on the traction motor boost threshold.

13. A control system for a hybrid vehicle having an engine, traction motor, and transmission, comprising:
a controller having stored upshift and downshift schedules with at least one downshift schedule having an associated traction motor boost torque curve, wherein the controller increases traction motor torque in response to an accelerator pedal position greater than the traction motor boost torque curve and less than a downshift schedule value associated with current vehicle speed.

14. The control system of claim 13 wherein the controller commands a transmission downshift when the accelerator pedal position for the current vehicle speed exceeds the downshift schedule value for the current vehicle speed.

15. The control system of claim 13 wherein the controller increases traction motor torque by an amount based on the traction motor boost torque curve and a battery state-of-charge.

16. The control system of claim 15 wherein the controller 25 wherein the controller increases traction motor torque only when a battery state-of-charge exceeds a corresponding lower threshold.

17. The control system of claim 16 wherein the controller increases traction motor torque by a linearly interpolated amount between zero and a maximum boost torque associated with the traction motor boost torque curve based on battery state-of-charge being between the lower threshold and an upper threshold.

* * * * *